US010043075B2

(12) United States Patent
Bennett et al.

(10) Patent No.: US 10,043,075 B2
(45) Date of Patent: Aug. 7, 2018

(54) EYE FEATURE IDENTIFICATION

(71) Applicant: Microsoft Technology Licensing, LLC, Redmond, WA (US)

(72) Inventors: Michael Martin Bennett, Woodinville, WA (US); Gregory Hitchcock, Woodinville, WA (US); Kevin Larson, Seattle, WA (US); Paul Linnerud, Woodinville, WA (US); Tanya Matskewich, Redmond, WA (US); Robert Matthew McKaughan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 40 days.

(21) Appl. No.: 14/946,591

(22) Filed: Nov. 19, 2015

(65) Prior Publication Data
US 2017/0147858 A1  May 25, 2017

(51) Int. Cl.
*G06K 9/00* (2006.01)
*G02B 5/02* (2006.01)
(Continued)

(52) U.S. Cl.
CPC ........ *G06K 9/0061* (2013.01); *G02B 5/0257* (2013.01); *G06F 3/013* (2013.01);
(Continued)

(58) Field of Classification Search
None
See application file for complete search history.

(56) References Cited

U.S. PATENT DOCUMENTS 6,542,624 B1\*  4/2003  Oda ................... G06K 9/00597
                                            382/117
7,379,567 B2\*  5/2008  Azuma .............. G06K 9/00597
                                            382/117
(Continued)

OTHER PUBLICATIONS

Hammoud, R. et al., Pages from "Passive Eye Monitoring Algorithms Applications and Experiments", Book published by Springer Publishing Company, Jan. 1, 2008, p. 8 and p. 112.
(Continued)

*Primary Examiner* — Mia M Thomas
(74) *Attorney, Agent, or Firm* — Alleman Hall Creasman & Tuttle LLP

(57) ABSTRACT

An image of an eye is obtained via a camera. A multi-step filter is applied to the image for multiple iterations. Applying the multi-step filter includes, for each iteration, performing one or more pixel merge operations on the image. The pixel merge operations are controlled based on one or more input parameters to control whether or not the iteration classifies pixels of the image as corresponding to a feature of the eye. The one or more input parameters vary from at least one iteration to another. The iterations each output a provisional output, in which some pixels of the image are deemed as corresponding to the feature of the eye. The provisional outputs provide diverse definitions of the eye feature, and may be combined in various ways to yield a refined output, in which some pixels of the image are deemed as corresponding to the feature of the eye.

20 Claims, 4 Drawing Sheets

(51) Int. Cl.
*G06F 3/01* (2006.01)
*G06T 5/00* (2006.01)
*G06T 5/20* (2006.01)

(52) U.S. Cl.
CPC ..... *G06K 9/00335* (2013.01); *G06K 9/00604* (2013.01); *G06K 9/00617* (2013.01); *G06T 5/002* (2013.01); *G06T 5/009* (2013.01); *G06T 5/20* (2013.01); *G06T 2207/10024* (2013.01); *G06T 2207/20004* (2013.01); *G06T 2207/20208* (2013.01); *G06T 2207/20221* (2013.01); *G06T 2207/30201* (2013.01)

(56) References Cited

U.S. PATENT DOCUMENTS

| | | | |
|---|---|---|---|
| 7,486,806 B2* | 2/2009 | Azuma | G06K 9/00597 340/5.82 |
| 8,000,526 B2* | 8/2011 | Ciuc | G06K 9/0061 382/167 |
| 8,036,458 B2* | 10/2011 | Ciuc | G06K 9/0061 382/167 |
| 8,265,392 B2* | 9/2012 | Wang | G06K 9/00248 382/173 |
| 8,290,267 B2* | 10/2012 | Ciuc | G06K 9/0061 382/173 |
| 8,885,882 B1 | 11/2014 | Yin et al. | |
| 9,417,452 B2* | 8/2016 | Schowengerdt | G06F 3/012 |
| 9,456,754 B2* | 10/2016 | Kocherscheidt | A61B 5/0088 |
| 9,679,192 B2* | 6/2017 | Luo | G06K 9/00221 |
| 9,857,605 B2* | 1/2018 | Popovich | G02B 27/48 |
| 2003/0169213 A1* | 9/2003 | Spero | G02B 5/20 345/7 |
| 2006/0147094 A1* | 7/2006 | Yoo | G06K 9/00604 382/117 |
| 2007/0183661 A1* | 8/2007 | El-Maleh | G06K 9/00234 382/173 |
| 2008/0226148 A1* | 9/2008 | Gu | G06T 5/007 382/128 |
| 2010/0195883 A1* | 8/2010 | Patriarche | G06K 9/3233 382/131 |
| 2012/0314216 A1* | 12/2012 | Hyers | G01M 11/0264 356/402 |
| 2013/0114850 A1* | 5/2013 | Publicover | G06K 9/00604 382/103 |
| 2013/0251267 A1* | 9/2013 | Kafuku | G06T 11/60 382/195 |
| 2014/0078283 A1* | 3/2014 | Nistico | A61B 3/0008 348/78 |
| 2014/0112550 A1* | 4/2014 | Hanna | G06K 9/00604 382/117 |
| 2014/0133777 A1* | 5/2014 | Kafuku | G06T 5/007 382/270 |
| 2014/0152792 A1* | 6/2014 | Krueger | G01C 23/00 348/78 |
| 2014/0184496 A1* | 7/2014 | Gribetz | G02B 27/017 345/156 |
| 2014/0270405 A1* | 9/2014 | Derakhshani | G06K 9/0061 382/117 |
| 2015/0003727 A1* | 1/2015 | Carpenter | G06K 9/00335 382/164 |
| 2015/0092983 A1 | 4/2015 | Nguyen et al. | |
| 2015/0296193 A1* | 10/2015 | Cote | H04N 9/646 382/167 |
| 2015/0302652 A1* | 10/2015 | Miller | G06F 3/011 345/419 |
| 2016/0019422 A1* | 1/2016 | Savvides | G06K 9/00597 382/117 |
| 2017/0147858 A1* | 5/2017 | Bennett | G06K 9/0061 |
| 2017/0206401 A1* | 7/2017 | Kaehler | G06F 3/013 |
| 2017/0206412 A1* | 7/2017 | Kaehler | G06F 3/013 |

OTHER PUBLICATIONS

Rathgeb, C. et al., Pages from "Iris Biometrics From Segmentation to Template Security", Book published by Springer Publishing Company, Jan. 1, 2013, pp. 50-73.

ISA European Patent Office, International Search Report and Written Opinion Issued in PCT Application No. PCT/US2016/061785, dated Feb. 6, 2017, WIPO, 24 pages.

Xiong, et al., "Eye Gaze Tracking Using an RGBD Camera: A Comparison with an RGB Solution", In Proceedings of the ACM International Joint Conference on Pervasive and Ubiquitous Computing: Adjunct Publication, Sep. 13, 2014, 9 pages.

Valenti, et al., "Webcam-based Visual Gaze Estimation", In Proceedings of 15th International Conference Image Analysis and Processing, Sep. 8, 2009, 10 pages.

Wild, David Jonathan, "Gaze Tracking Using a Regular Web Camera", In Thesis, Nov. 2012, 64 pages.

Sewell, et al. "Real-Time Eye Gaze Tracking With an Unmodified Commodity Webcam Employing a Neural Network", In Proceedings of Conference on Human Factors in Computing Systems, Apr. 10, 2010, pp. 3739-3744.

Ince, et al., "A 2D eye Gaze Estimation System With Low-Resolution Webcam Images", In Journal on Advances in Signal Processing, Aug. 12, 2011, 11 pages.

Saad, et al., "Robust and Fast Iris Localization Using Contrast Stretching and Leading Edge Detection", In International Journal of Emerging Trends & Technology in Computer Science, vol. 3, Issue 2, Mar. 2014, pp. 61-67.

Goñi, et al., "Robust Algorithm for Pupil-Glint Vector Detection in a Video-oculography Eyetracking System", In Proceedings of 17th International Conference on the Pattern Recognition, vol. 4, Aug. 23, 2004, 4 pages.

Jianfeng, et al., "Eye-Model-Based Gaze Estimation by RGB-D Camera", In Proceedings of IEEE Conference on Computer Vision and Pattern Recognition, Jun. 23, 2014, pp. 592-596.

Nawaz, et al., "Real Time Eye Tracking and Blink Detection Using Low Resolution Web Cam", Published on: Sep. 16, 2004 Available at: http://www.engr.mun.ca/~sircar/project1_files/ys.doc.

Mora, et al., "3D Gaze Tracking and Automatic Gaze Coding from RGB-D Cameras", In Proceedings of IEEE Conference in Computer Vision and Pattern Recognition, Vision Meets Cognition Workshop, Jun. 2014, pp. 4321-4322.

Nagpure, et al., "Eye Motion Detection Using Single Webcam for Person with Disabilities", In International Journal of Engineering Research & Technology, vol. 3, Issue 3, Mar. 2014, pp. 2199-2203.

Javal, Louis Émile, "Gaze Tracking", Retreived on: Jun. 4, 2015, Available at: http://home.iitk.ac.in/~shash/cs676/project/report.pdf.

Ferhat, Onur, "Eye-Tracking with Webcam-Based Setups: Implementation of a Real-Time System and an Analysis of Factors Affecting Performance", Retreived on: Jun. 4, 2015, 48 pages.

Hansen, et al., "In the Eye of the Beholder: A Survey of Models for Eyes and Gaze", In Proceedings of IEEE Transactions on Pattern Analysis and Machine Intelligence, vol. 32, No. 3, Mar. 2010, pp. 478-500.

"Second Written Opinion Issued in PCT Application No. PCT/US2016/061785", dated Dec. 22, 2017, 16 Pages.

Sahmoud, S. et al., "Efficient Iris Segmentation Method in Unconstrained Environments", Pattern Recognition, vol. 46, Issue 12, Dec. 2013, 12 pages.

Radu, P. et al., "A Versatile Iris Segmentation Algorithm", Proceedings of the Biometrics Special Interest Group, BIOSIG 2011 Biometrics and Electronic Signatures, Sep. 8, 2011, Darmstadt, Germany, 13 pages.

"International Preliminary Report on Patentability Issued in PCT Application No. PCT/US2016/061785", dated Mar. 9, 2018, 15 Pages.

* cited by examiner

EYE FEATURE IDENTIFICATION

BACKGROUND

Determining eye position/movement, otherwise referred to as eye tracking, may be employed in various applications and is typically supported by an underlying identification of an eye feature. The eye feature identification can be performed in various ways. In one example, eye position is determined by analyzing an image of an eye to identify pixels corresponding to the eye feature being identified.

DETAILED DESCRIPTION

Figure 1:
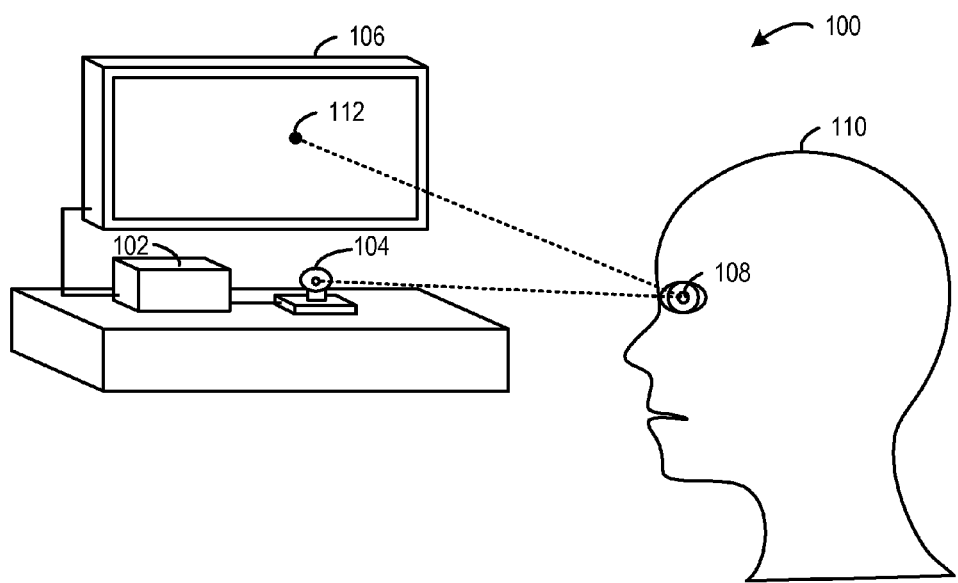
FIG. 1 shows an example eye tracking computing environment.

Typical eye tracking approaches rely on capturing infrared (IR) images and processing them with specialized hardware. IR images are in some cases favored over visible-light images (e.g., red-green-blue (RGB) imagery), because they often have characteristics that facilitate eye tracking. Among other things, an IR image may be less susceptible to signal noise and environmental factors. However, use of IR technology limits the associated eye tracking methods to being performed with hardware that typically is not incorporated into smartphones, laptops and other general purpose computing devices.

The present description contemplates various approaches for robust and accurate detection of eye features using a range of imaging technologies including and other than infrared, for example using RGB images captured via a webcam or smartphone. Specific examples are directed toward detecting a pupil, though the methods encompass detecting other eye features (e.g., iris, sclera, eyelids). Detection is achieved by applying a multi-step filter to an image of an eye over multiple iterations. The multi-step filter may include a noise reducing filter (e.g., an anisotropic diffusion filter) and a contrast stretching operation. Each may be applied at least once during a particular iteration of the multi-step filter.

Each iteration manipulates the input image so that, in pupil examples, some pixels are shifted into and/or out of a "pupil range" of color values (potentially including a single color value) to produce a provisional output. In the provisional output, pixels having values within the pupil range are deemed/classified, for purposes of that output, as corresponding to the subject's pupil. In many cases, a regional constraint will also be imposed, namely, that to be considered a pupil pixel, the candidate pixel must also be within a central portion of the input image and/or within a likely pupil boundary. For example, a provisional pupil definition might exclude pixels in an area that would normally correspond to the iris.

One or both of the noise reducing filter and contrast stretching operation may be controlled differently from iteration to iteration. The degree of blur used may vary from iteration to iteration, for example, or the contrast stretching operation may employ shifting cutoffs to control how aggressively contrast is manipulated. Whatever the specific implementation, the varied filter control produces provisional outputs that vary from iteration to iteration. Effectively, each iteration has a different (differences often will be slight) definition of what is the subject's pupil.

The multi-step filter uses the provisional outputs in some combined fashion (summing, averaging, weighting, selectively using higher-quality outputs, etc.) to yield a refined output. In some cases, this allows for an advantageous balancing of tradeoffs. For example, a pupil definition might have one particularly favorable characteristic achieved via filter control that sacrifices most everything else. Using other pupil definitions can allow that favorable characteristic to be leveraged while avoiding the attendant downsides of the filtering operation. Combination may compensate for anomalies, incongruities, weaknesses, etc. Combination may be implemented in any practicable way to make beneficial use of the provisional definitions so as to achieve an accurate final pixel classification.

In many cases, the above-referenced eye tracking approach may be carried out on typical and widely-available computing hardware, such as laptops, tablets, smartphones and the like. The approach enables accurate eye tracking functionality on these devices without requiring the complexity and specialized hardware associated with many existing eye tracking platforms. In some examples, however, the approach may be used in connection with complex/specialized systems to extend and enhance functionality.

Prior to discussing the eye tracking approach in more detail, an example eye tracking computing environment 100 is described with reference to FIG. 1. The eye tracking computing environment 100 is shown in simplified form. The eye tracking computing environment 100 may include a computing system 102 in communication with a camera 104, and a display 106. The camera 104 may be configured to capture an image of an eye 108 of a user 110. The camera 104 may send the image to the computing system 102 for eye tracking processing and analysis (e.g., pupil detection and identification).

The computing system 102 may apply a multi-step filter to the image for multiple iterations to determine which pixels of the image correspond to a particular eye feature, such as a pupil. The determined pixels may also be characterized and/or determined as having an area, boundary or other spatial aspect. For example, in the case of a pupil, the pupil pixels will normally be in a central area of the image and bounded by a roughly circular pupil boundary, which typically may be roughly approximated from the initial input image. In some examples, the pixels constituting the eye feature may be used for authentication/recognition purposes or to track eye position or gaze. Aspects of the multi-step filter will be discussed in further detail below with reference to FIG. 2.

As briefly mentioned above, a determined pupil position may be used for gaze tracking of the user 110. In particular, a gaze vector of the eye 108 may be projected from the pupil position to a location 112 that intersects the display 106. The gaze vector may be used to determine an object at which the user is gazing (e.g., a displayed object at a particular location). Such gaze tracking may also enable the user 110 to interact with the computing system 102 via gestures of the eye. For example, the computing system 102 may be configured to detect user selection of one or more objects visually presented via the display 106 (e.g., a human subject in an image) responsive to establishing a dwell location. Determining a gaze vector is one example approach to mapping pupil coordinates (e.g., in camera frame) to screen coordinates. Other non-limiting approaches include fitting pupil camera coordinates to screen coordinates via regression functions, and other statistical and machine learning techniques.

In another example implementation, a pupil position itself without regards to a specific screen coordinate may also be analyzed to gain insight into the user. In one example, the pupil position of a user may be analyzed to infer a mental state of the user. For example, erratic pupil motion may indicate that the user is confused during a search task. On the other hand, stable pupil motion may indicate that the user is reading intently. In another example, pupil motion may indicate that the user is happy or angry.

The depicted components of the eye tracking computing environment 100 are described for the purpose of example, and are meant to be non-limiting. Further, the physical configuration of the depicted components of the eye tracking computing environment 100 may take a variety of different forms without departing from the scope of the present disclosure. For example, the computing system 102, the camera 104, and the display 106 may be integrated into a single device, such as a mobile computing device and/or a virtual reality (VR) or mixed-VR device.

Figure 2:
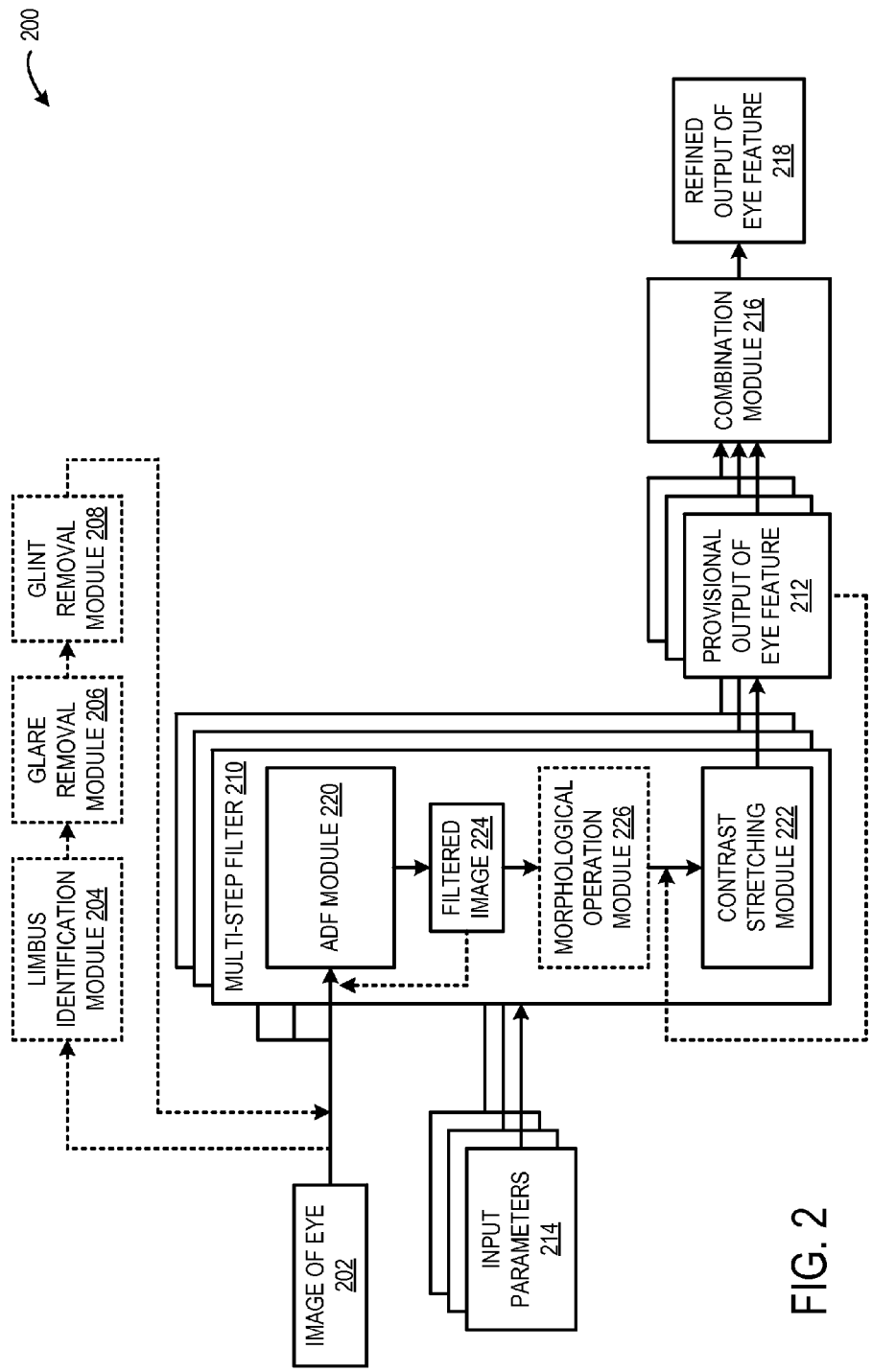
FIG. 2 shows an example eye tracking subsystem that may be employed by a computing system to identify an eye feature.

FIG. 2 shows an example eye tracking subsystem 200 configured to determine which pixels of an input image correspond to an eye feature. The determined pixel set may be further used to determine an area, position, boundary or other aspect associated with the eye feature. In one example, the eye tracking subsystem 200 is implemented by the computing system 102 of FIG. 1. In another example, the eye tracking subsystem 200 is implemented by the computing system 400 of FIG. 4.

The eye tracking subsystem 200 may receive as input one or more images 202 obtained via a camera, such as camera 104 of FIG. 1. Any suitable type of camera may be used to capture the one or more images 202. In many examples, the image 202 is captured by an RGB camera, and further discussion of the image 202 will primarily be in the context of an RGB image. In some implementations, one or more parameters of the camera may be adjusted to particularly enhance clarity, sharpness, etc., for purposes of highlighting the eye and facilitating pixel classification. In one example, a level of focus and zoom may be adjusted to optimize red channel aspects of the input image. Some implementations involve a red channel focus, because the red channel in some cases depicts boundary delineations or other features more prominently/clearly than the green and blue channels. However, parameters of the camera may be adjusted to enhance blue/green channels, or other features, in order to provide beneficial pre-processing to aid the ultimate pixel classification. In some implementations, the parameters of the camera may be adjusted based on feedback of an identified eye feature. For example, images having a certain character/quality that make for easy (e.g., less processing) identification of the eye feature may be used to adjust the parameters of the camera.

The one or more images 202 may include at least a portion of an eye that is suitably large enough to include, and permit identification of, a target feature of the eye (e.g., pupil). In one example, the image 202 includes an entirety of the eye. In some instances, the image 202 may include additional facial features including an eyelid, eyebrow, cheek, nose, and other facial features. Any suitable number of image frames (e.g., one image frame, a series of image frames) may be processed by the eye tracking subsystem 200 to identify an eye feature.

In some implementations, the eye tracking subsystem 200 optionally may include one or more pre-processing modules configured to reduce noise of the image 202 and/or reduce a processing area of the image 202. Such pre-processing modules may reduce an amount of time and/or an amount of processing needed to identify the eye feature in the image 202. In particular, the eye tracking subsystem may include one or more of a limbus identification module 204, a glare removal module 206, and a glint removal module 208. Though referred to as performing "pre-processing" operations, one or more of these modules may be positioned at other locations in the processing flow, for example after one or more iterations of the below-described multi-step filter 210.

The limbus identification module 204 may be configured to identify an outline of a boundary between a limbus and an iris of an eye. The limbus boundary may define a region of the eye that includes the pupil and the iris. By identifying this boundary, all pixels that lie outside of the boundary may be eliminated from further processing by the eye tracking subsystem 200. As such, the eye tracking subsystem 200 may identify a pupil (or other eye feature) more quickly relative to an approach where all pixels of the image are processed. In one example, the limbus identification module 204 is configured to apply a Gaussian blur filter to the image 202 to yield a blurred image. Next the limbus identification module 204 is configured to convert the blurred image to an indexed image, and segment the indexed image into iris and non-iris segments based on a color distance transform. The limbus identification module 204 is configured to clear areas of the indexed image that are marked as iris segments but overlap an outer border of the indexed image, and fill in holes in the iris segments. This process generates a mask that outlines an area occupied by the iris and the pupil. The pixels that are contained in the area outlined by the mask may be designated for further processing by the eye tracking subsystem 200. For example, the image or a portion thereof (e.g., the pixels in the limbus region) may be processed by the glare removal module 206.

Glare is light diffused across the eye, which can be part of the eye, or on a separate surface in front of the eye, such as glasses. Glare may obscure eye features being identified. Accordingly, the glare removal module 206 may be configured to remove signal noise due to glare from at least a portion of the image 202 in order to more clearly depict the features of the eye. In some implementations, the glare removal module 206 may process the entire image 202. In other implementations, the glare removal module 206 may process only a portion of the image 202, such as a pixel region identified as being within the limbus boundary.

In one example, the glare removal module 206 may be configured to remove glare from the image 202 by generating a glare difference map and subtracting the glare difference map from each channel of the image 202. In one example, for an input RGB image, the glare difference map (GDM) is generated by:

$$GDM = ((B-R) + (G-R))/2$$

where B is a matrix including blue pixels, G is a matrix including green pixels, and R is a matrix including red pixels. The glare difference map may be represented in forms other than matrices. The GDM is then used to adjust the input RGB image, by subtracting the GDM from each color channel:

$$R = R - GDM$$

$$G = G - GDM$$

$B = B - GDM$

In one example, any values below 0 can be rounded to 0. In another example, the RGB image can be normalized to a range between 0 and 255. The resulting image may have reduced noise due to glare. The image may be designated for further processing by the eye tracking subsystem 200. For example, the image or a portion thereof may be processed by the glint removal module 208.

Glints are discrete noise elements produced by light reflected from the surround environment. For example, glints may be produced from light reflected by displays (e.g. televisions, cellphones, computer monitors), overhead lights, ceiling fans, and other light sources. In some cases, glints may obscure features of the eye that are trying to be identified. Accordingly, in some implementations, the glint removal module 208 may be configured to remove signal noise due to glints from at least a portion of the image 202 in order to more clearly depict the features of the eye. In one example, the glint removal module 208 may be configured to apply a sequence of morphological operations to reduce noise due to glints. Different morphological operations may probe an image with a small shape or template called a structuring element. The structuring element is compared with corresponding neighborhoods of pixels. Some operations test whether the structuring element "fits" within the neighborhood, while others test whether it "hits" or intersects the neighborhood. A morphological operation creates an image in which a pixel has a non-zero value only if a morphological test is successful at that location in the input image. In one particular example, the sequence of morphological operations include Erosion, Opening, Dilation, and Closure. The size and shape of the structuring element used for the morphological operations can be decided based on a capture eye size in the image 202. In some implementations, the glint removal process may be further refined by estimating a size of a glint and then picking a size and shape of the morphological operation based on the glint size.

Additionally or alternatively, the glint removal module 208 may be configured to apply a white top-hat morphological filter where the strength of the top-hat filter is increased by a particular weight (e.g., 10%) and then subtracted from the input image. The resulting image may have reduced noise due to glints. The image may be designated for further processing by the eye tracking subsystem 200. For example, the image or a portion thereof may be processed by a multi-step filter 210.

In some implementations, glints may be deliberately introduced in order to improve accuracy of pupil identification and gaze tracking.

The multi-step filter 210 may be applied to the image 202 over multiple iterations to yield one or more provisional outputs 212 defining an eye feature (e.g., pupil, iris). The multi-step filter 210 may be configured to process the image 202 using one or more selected values of input parameters 214 that control pixel processing operations. Across the iterations of multi-step filter 210, the one or more input parameters 214 may be selected so that there is at least some iteration-to-iteration variation. For example, a given pixel processing operation may more aggressively modify image 202 in a particular iteration, relative to other iterations.

Any type of input parameter that controls pixel processing operations may be used. Parameter types/values will be affected by the specific processing operations used by the multi-step filter. The examples herein are directed to pixel merge operations (de-noising, contrast stretching, smoothing, etc.) though it will be appreciated that the varied iteration approach herein may be employed with a wide range of other pixel processing operations directed to identification of eye features.

By varying the values of the input parameters 214 for at least some of the iterations, the multi-step filter 210 produces different outputs in which some pixels are deemed as corresponding to the sought-after eye feature. The differing outputs associated with the iterations may be referred to as provisional outputs, because they are produced by single iterations and, in the context of the overall method, are considered individual intermediate approximations. In some examples, the individual provisional outputs may have a mix/balance of strengths and weakness. For example, an aggressively-applied filter may desirably filter noise, but reduce definition of the sought-after eye feature. In a pupil detection implementation, general knowledge of the pupil boundary may be leveraged to make intelligent use of an output that undesirably blurs the pupil boundary (e.g., near-boundary regions of a high-blur output may be disregarded). In general, collective and intelligent use of a range of provisional outputs can compensate for anomalies, incongruities and other weaknesses associated with individual outputs, while taking advantage of the useful information provided by each.

To leverage the multiple provisional outputs, eye tracking subsystem 200 may include a combination module 216. The combination module 216 makes collective use of the provisional outputs 212, as mentioned above, to convert a group of approximate eye feature definitions into a final eye feature definition that classifies some pixels of the input image as corresponding to the sought-after eye feature. Specifically, the provisional outputs 212 are collectively used to yield a refined output 218. Combination of the provisional outputs will be described in more detail below.

The multi-step filter 210 may include one or more pixel merge operations which cause some pixels in the input image to take on values that are closer to those of nearby pixels (e.g., noise reduction). In the present examples, each iteration may include operation of an anisotropic diffusion filter module 220 and a contrast stretching module 222. The anisotropic diffusion filter 220 is implemented in the present example as an edge-aware blurring filter. Accordingly, application of the anisotropic diffusion filter reduces noise in the image while at the same time limiting the blurring effect at detected edges in the image. This operation merges pixel values in the image while at the same time enhancing/preserving sharp color value transitions at boundaries within the image (e.g., color boundaries between the iris and pupil). In some implementations, the anisotropic diffusion filter 220 may combine multiple anisotropic filters at varying scales or across different scales to yield the filtered image 224.

In some implementations, the anisotropic diffusion filter module 220 may apply one or more filters multiple times in a particular iteration of the multi-step filter 210. For example, a filter may be applied a first time to the image 202 to yield the filtered image 224. The filtered image 224 may be fed back as input to the filter to yield another image that is further filtered. This feedback loop may be cycled through any suitable number of times to yield an image that is suitably smoothed and/or until edges in the image are suitably enhanced.

One input parameter 214 that may be varied from iteration to iteration is the degree of blur introduced by anisotropic diffusion filter 220. Though the filter is edge-aware, it typically reduces edge definition to some extent even when modestly applied. In some cases, the degree of blur employed is based on the size of the input image 202. For example, a degree of blur that strikes an appropriate balance of edge preservation and de-noising for a relatively large image may overly blur a smaller image. Another image property that may inform how much blur to apply is the presence/degree of existing noise in the input image. Further, sharpness, brightness/exposure, contrast, color balance and any other characterization/assessment may affect the control of anisotropic diffusion filter 220. Such assessments may also be made with respect to provisional outputs. For example, based on the effect a certain amount of blur has on the input image (e.g., producing a low-quality pupil estimation), a degree of blur may be adjusted for another of the iterations to yield a different provisional output (e.g., of higher quality in some respect).

Another consideration in determining blur values may be how many iterations are to be used for multi-step filter 210. For example, it may be determined in advance that a given end-to-end range of blur is advantageous in terms of providing a good spectrum of intermediate pupil definitions. Accordingly, if a smaller number of iterations are to be used, then there will be larger steps adjusting blur from iteration to iteration across the desired range.

In some implementations, the multi-step filter 210 may include a morphological operation module 226 configured to perform one or more morphological operations on the filtered image 224. For example, the edge-aware de-noising performed by module 220 may exacerbate particular discrete noise elements while reducing an overall noise level of the image 202. The morphological operation module 226 may perform operations to remove the discrete noise elements from the filtered image 224. The morphological operation module 226 may perform any suitable morphological operations on the filtered image 224.

The contrast stretching module 222 may be configured to perform one or more contrast stretching operations on the filtered image 224. Typically, this involves merging pixels having color values at extreme upper and/or lower ranges. For example, the brightest and/or darkest 5% of the pixels in the image may be merged so that they all have the same color value, or are compressed into a smaller color value range. Subsequent to this merging operation, the color values of the non-merged pixels may then be stretched across a larger range than they initially occupied. In any case, the contrast stretching operation may be defined via an upper and/or lower cutoff. When both upper and lower cutoffs are employed, the output for typical implementations will have made bright pixels brighter, and dark pixels darker. For pupil detection, appropriate application of contrast stretching and edge-aware blurring, particularly when applied differently over multiple iterations to yield intelligently combined outputs, can greatly facilitate accurate identification of pupil pixels, even when only using conventional computing device configurations.

In some implementations, one or more of the contrast stretching operations may be applied to specific regions of the filtered image 224. In some cases, different contrast stretching operations may be applied to the same region of the filtered image 224. In some cases, different contrast stretching operations may be applied to different regions of the filtered image 224. In some cases, one or more contrast stretching operations are applied to a specific eye feature, and the one or more contrast stretching operations are not applied to another eye features. In some implementations, one or more contrast stretching operations may be applied to an entirety of the filtered image 224.

One or more of the input parameters 214 may also be used to control the contrast stretching operation. For example, one or both of the upper and lower cutoffs may be controlled to affect the range of pixel values that are merged. For some of the provisional outputs 212, it may be desirable to merge a relatively large range of pixel values. For example, in a system directed to identifying a pupil, it may be desirable to consolidate a large range of the brightest pixels in the image while consolidating a relatively smaller range on the dark end (to avoid an overly large central area incorrectly taking on pupil values).

Cutoffs may be varied from one iteration to the next. As with the anisotropic diffusion filtering, varying this pixel merging operation will result in different provisional outputs defining the eye feature. One cutoff may provide specific benefits (i.e., in its associated provisional output) that are usable to hone the eventual final definition of the eye feature. Generally, varied cutoffs produce varied provisional definitions of the eye feature, which may be used in combination to achieve a more accurate pixel definition of the eye feature. In some examples, cutoff values incrementally step through a range over the iterations (e.g., taking on 5 different values in a 5 iteration processing flow).

In some cases, the contrast stretching module will be used repeatedly and recursively within a given iteration of multi-step filter 210 to converge on an appropriately contrast result. This may be employed to assist in providing a clear delineation between pixels corresponding to the eye feature and non-feature pixels. In some cases, this recursive contrast stretching can yield better results than a single-pass stretch. When multiple recursions are employed, one variation of input parameters 214 may be how many recursions to use with module 222 per iteration. An iteration with a larger number of contrast stretching recursions will produce a different provisional output than produced with a smaller number of recursions. As described above, having multiple and diverse intermediate eye feature definitions may be used collectively to lead to a more accurate final definition. In a more specific example, it may be determined at design time, or over a course of operation, that it is beneficial to have a single recursion in some iteration outputs, two recursions in other iteration outputs, and three recursions in other iteration outputs.

Recursion for contrast stretching is implemented via feedback, in which output from a given recursion is supplied to a subsequent recursion as an input. As mentioned above, in some cases anisotropic diffusion may be performed multiple times in a given iteration. In any case, modules 220 and 222 may be invoked the same or a different number of times for a given iterations.

In some implementations, the contrast stretching module 222 may be configured to identify multiple different eye features. In one example, a pupil may be identified by setting the lower cutoff value to the darkest 1% and varying the upper threshold value for multiple cycles. Further, once the pupil is identified, an iris may be identified by setting the lower cutoff to the darkest 20% and varying the upper threshold value for multiple cycles.

The provisional outputs 212 are used by the eye tracking subsystem 200 to output a refined output 218 that defines a particular feature of the eye. More particularly, in the refined output, a subset of the pixels from the input image are deemed as corresponding to the pupil or other eye feature being detected. The eye tracking subsystem 200 may output the refined output 218 of the eye feature in any suitable manner. In some implementations, this may include visually presenting, via a display, the image 202 of the eye with a visual representation of the refined area 218 overlaid on the eye feature. For example, the image 202 may be visually presented such that the boundary of the pupil is highlighted or otherwise visually indicated. In other implementations, the refined output 218 may be provided to another subsystem of a computing system (e.g., computing system 102 of FIG. 1, computing system 400 of FIG. 4) to be used in other image processing or control operations. For example, the refined area 218 may be used by a gaze tracking subsystem to provide gaze tracking functionality (e.g., control of a software application via eye movement).

In some implementations, it may be desirable to constrain operations to particular color channels, or to otherwise conduct processing in a manner that is informed by color. For example, in some environments it may be easier to detect pixels corresponding to a pupil by processing only the red color channel. Accordingly, anisotropic diffusion filtering and contrast stretching may only be performed on the red channel (or output analysis may be constrained to only red channel values). Further, filtering and contrast stretching may be performed on the red channel in order to also find the Iris boundary, as the eye signal is less mixed with environment signals (light reflected on the eye) in the red channel. The red channel can also exhibit more robustness under different lighting conditions than the blue channel. In some implementations, comparisons between red channel and blue channel values may be performed to determine what image features are part of the eye, versus part of the environment (e.g., glint and glare are less easily identifiable in the red channel, and more easily identifiable in the blue channel. And to the extent that processing/analysis is limited by color, camera operation and/or pre-processing may be controlled to enhance information in the relevant colors.

As indicated above, the eye tracking subsystem 200 may include a combination module 216, which collectively uses provisional outputs 212 to generate a refined output 218. Both the provisional and refined outputs include a pixel classification, in which some pixels of the input image are classified as corresponding to the pupil or other eye feature.

In one example, some or all of the provisional outputs 212 are averaged to generate the refined output 218. This may be understood in the context of an individual pixel. The values for that pixel from each provisional output may be summed/averaged. If the average value is equal or close to a predefined value (e.g., a particular black level), then that pixel is deemed to correspond to the pupil.

Summing/averaging may include weighting certain provisional outputs 212 over others, and/or may include differentially weighting portions of a provisional output 212. For example, applying a high degree of blur may yield a provisional output with poor edge definition at the pupil boundary, but with other portions of the image being desirably de-noised. Combination module 216 could therefore heavily weight areas that are clearly away from the likely pupil boundary (i.e., so that the "good pixels" are heavily considered), while de-weighting or discounting altogether the pixels that are near the likely pupil boundary. Conversely, an iteration with minimal contrast stretching and modest filtering by module 220 might be weighted heavily near the likely pupil boundary while relatively discounted in other areas.

In another combination example, the activation rate of a pixel is considered. For example, if a majority or certain percentage of provisional outputs 212 agree that a pixel forms part of the pupil, then that pixel can be deemed a "pupil pixel" in the final output.

In general, the present disclosure contemplates any type of pixel merge operation(s) that shifts pixels into and out of a color range associated with an eye feature to be detected.

The processing operation is variably controlled over multiple iterations so as to yield differing provisional pixel classifications (outputs) of the eye feature. Typically, this variable control is performed to achieve a desired range of diversity in the provisional outputs. That diversity is taken advantage of in combining the provisional outputs to obtain a final, more accurate, refined output. In many settings, this method of generating and using multiple diverse approximations allows for rapid and accurate eye feature detection, without the need for capabilities beyond those normally found in general purpose computing devices.

Figure 3:
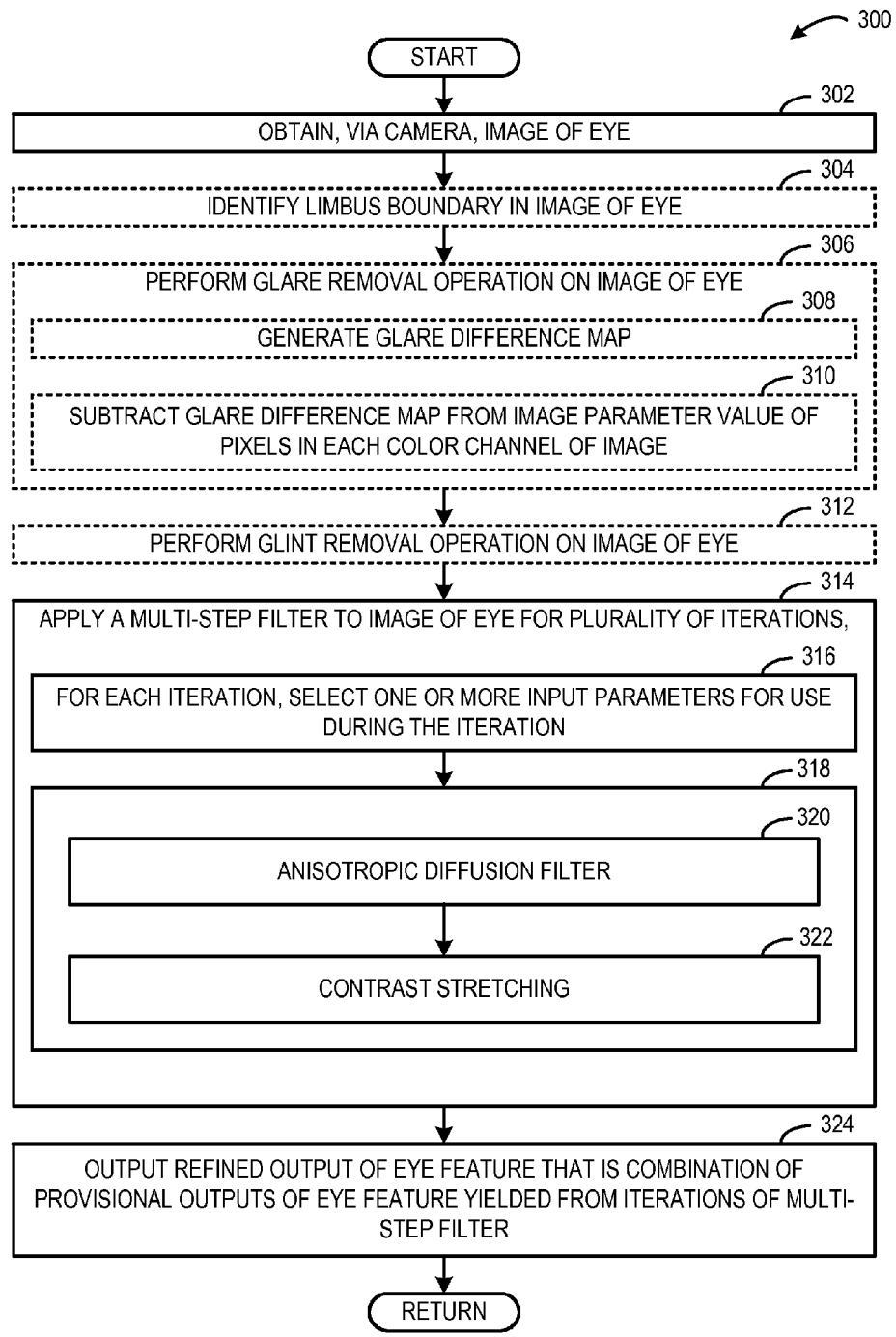
FIG. 3 shows an example method for identifying an eye feature.

FIG. 3 shows an example method 300 for identifying an eye feature. In one example, the method 300 may be performed by the computing system 102 of FIG. 1. In another example, the method 300 may be performed by the computing system 400 of FIG. 4. More particularly, the method 300 may be performed by various components of the eye tracking subsystem 200 of FIG. 2 in any suitable computing system.

At 302, the method 300 includes obtaining an image of an eye via a camera. Any suitable type of image may be obtained from any suitable type of camera. In one example, the image is an RGB image provided by an RGB camera, such as a desktop/laptop camera or smartphone camera.

In some implementations, at 304, the method 300 optionally may include identifying a limbus boundary of the eye in the image. In such implementations, further processing may be applied only to pixels of the image that are located within the limbus boundary of the eye. In one example, the limbus boundary is identified by the limbus identification module 204 of FIG. 2.

In some implementations, at 306, the method 300 optionally may include performing a glare removal operation on the image of the eye. In one example, the glare removal operation is performed by, at 308, generating a glare difference map. The glare difference map includes an average difference of an image parameter value (e.g., brightness value) of pixels in different color channels of the RGB image. In one example, for an input RGB image, the glare difference map is generated by: $GDM=((B-R)+(G-R))/2$, where B is a matrix of blue pixels, G is a matrix of green pixels, and R is a matrix of red pixels. Further, at 310, performing the glare removal operation may include subtracting the glare difference map from the image parameter value of pixels in each color channel of the RGB image. In one example, the glare removal operation is performed by the glare removal module 206 of FIG. 2.

In some implementations, at 312, the method 300 optionally may include performing a glint removal operation on the image of the eye. The glint removal operation may be performed in any suitable manner. In one example, the glint removal operation may be performed by the glint removal module 208 of FIG. 2.

At 314, the method 300 includes applying a multi-step filter to the image of the eye for a plurality of iterations. At 316, applying the multi-step filter includes, for each iteration, selecting one or more input parameters for use during the iteration. The selection may be performed so that one or more of the input parameters varies relative to another iteration. At 318, applying the multi-step filter includes, for each iteration, performing one or more pixel merge operations on the image of the eye. The one or more pixel merge operations are controlled based on the one or more input parameters so as to control whether or not the iteration classifies pixels as corresponding to a feature of the eye. As shown at 320, the one or more pixel merge operations may include application of an anisotropic diffusion filter. In one example, such an operation may be implemented via module 220 of FIG. 2. In some implementations, a different noise reducing filter may be applied as a pixel merge operation instead of the anisotropic diffusion filter. As shown at 322, the one or more pixel merge operations may also include a contrast stretching operation. In one example, such an operation may be implemented via module 222 of FIG. 2.

At 324, the method 300 includes outputting a refined output of the eye feature. The refined output may be a combination of the provisional outputs yielded from iterations of the multi-step filter. The refined output may be derived from the multiple provisional outputs in any suitable manner.

In some implementations, one or more of the method steps described and/or illustrated herein may be omitted without departing from the scope of this disclosure. Likewise, in some implementations, the indicated sequence of the method steps may not always be required to achieve the intended results, but is provided for ease of illustration and description. In some implementations, one or more of the method steps may be performed repeatedly, and in different portions of the indicated sequence depending on the particular strategy being used. For example, the glare removal operation indicated at 306 optionally may be repeated at various points throughout the method. In one example, the glare removal operation may be repeated after the glint removal operation at 312. In another example, the glare removal operation may be repeated after the anisotropic diffusion filter is applied at 320.

By applying the multi-step filter for a plurality of iterations with different values of input parameters, multiple slightly different areas that estimate the eye feature may be produced. In other words, as described above, a diversity of provisional outputs is obtained. Combined/collective use of these outputs can compensate for anomalies/incongruities, leverage specific benefits that flow from performing operations in a specific way, in general enable feature detection within a modest compute budget and, if desired, on smartphones, laptops, tablets and other conventionally-equipped computing devices.

In some implementations, the methods and processes described herein may be tied to a computing system of one or more computing devices. In particular, such methods and processes may be implemented as a computer-application program or service, an application-programming interface (API), a library, and/or other computer-program product.

Figure 4:
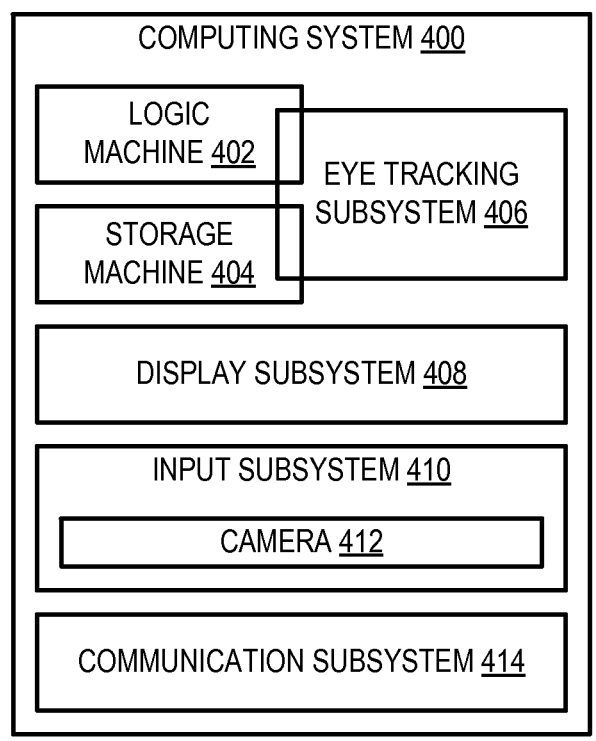
FIG. 4 shows an example computing system.

FIG. 4 schematically shows a non-limiting implementation of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices. For example, computing system 400 may represent computing system 102 of FIG. 1.

Computing system 400 includes a logic machine 402, a storage machine 404, and an eye tracking subsystem 406. Computing system 400 may optionally include a display subsystem 408, input subsystem 410, communication subsystem 414, and/or other components not shown in FIG. 4.

Logic machine 402 includes one or more physical devices configured to execute instructions. For example, the logic machine 402 may be configured to execute instructions that are part of one or more modules, applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 402 may include one or more processors configured to execute software instructions. Additionally or alternatively, the logic machine 402 may include one or more hardware or firmware logic machines configured to execute hardware or firmware instructions. Processors of the logic machine 402 may be single-core or multi-core, and the instructions executed thereon may be configured for sequential, parallel, and/or distributed processing. Individual components of the logic machine 402 optionally may be distributed among two or more separate devices, which may be remotely located and/or configured for coordinated processing. Aspects of the logic machine 402 may be virtualized and executed by remotely accessible, networked computing devices configured in a cloud-computing configuration.

Storage machine 404 includes one or more physical devices configured to hold instructions executable by the logic machine 402 to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The eye tracking subsystem 406 may be configured to recognize an area of an eye feature in an image of an eye obtained via a camera 412. In one example, the eye tracking subsystem 406 represents eye tracking subsystem 200 of FIG. 2. The eye tracking subsystem 406 may be instantiated or otherwise implemented by the logic machine 402 and the storage machine 404. In some implementations, the logic machine 402 may be configured to execute software instructions held by the storage machine 404 and representative of the eye tracking subsystem 406. Additionally or alternatively, the logic machine 402 may be configured to execute hardware or firmware instructions representative of the eye tracking subsystem 406. The eye tracking subsystem 406 may be implemented by the computing system 400 in any suitable manner.

The terms "module," "program," and "engine" may be used to describe an aspect of computing system 400 implemented to perform a particular function. In some cases, a module, program, or engine may be instantiated via logic machine 402 executing instructions held by storage machine 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by storage machine 404. This visual representation may take the form of a graphical user interface (GUI). As the herein described methods and processes change the data held by the storage machine 404, and thus transform the state of the storage machine 404, the state of display subsystem 408 may likewise be transformed to visually represent changes in the underlying data. Display subsystem 408 may include one or more display devices utilizing virtually any type of technology. Such display devices may be combined with logic machine 402 and/or storage machine 404 in a shared enclosure, or such display devices may be peripheral display devices.

When included, input subsystem 410 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The input subsystem 410 includes a camera 412 configured to image an eye. The image of the eye may be provided as input to the eye tracking subsystem 406. The camera 412 may employ virtually any type of imaging technology. Non-limiting example technologies include, but are not limited to, visible-light (e.g., RGB), infrared, depth, and other technologies. The camera 412 may be combined with logic machine 402, storage machine 404, and/or display subsystem 406 in a shared enclosure, or the camera 412 may be peripheral.

When included, communication subsystem 414 may be configured to communicatively couple computing system 400 with one or more other computing devices. Communication subsystem 414 may include wired and/or wireless communication devices compatible with one or more different communication protocols. As non-limiting examples, the communication subsystem 414 may be configured for communication via a wireless telephone network, or a wired or wireless local- or wide-area network. In some implementations, the communication subsystem 414 may allow computing system 400 to send and/or receive messages to and/or from other devices via a network such as the Internet.

In another example, implementation, a computing system comprises a camera configured to image an eye, a logic machine, and a storage machine holding instructions executable by the logic machine to: obtain, via the camera, an image of the eye, apply a multi-step filter to the image of the eye for a plurality of iterations, wherein applying the multi-step filter includes, for each iteration, (i) selecting one or more input parameters for use during the iteration, such selection being performed so that the one or more input parameters varies relative to another iteration, (ii) performing one or more pixel merge operations on the image, where at least one of the pixel merge operations is controlled based on the one or more input parameters so as to control whether or not the iteration classifies pixels as corresponding to a feature of the eye, and (iii) outputting, based on operation of the one or more pixel merge operations, a provisional output in which some pixels of the image are deemed as corresponding to the feature of the eye, and output, via combining the provisional outputs, a refined output in which some pixels of the image are deemed as corresponding to the feature of the eye. In one example implementation that optionally may be combined with any of the features described herein, the one or more pixel merge operations make use of an anisotropic diffusion filter configured to apply a degree of blur to the image of the eye, where the degree of blur varies for at least some of the iterations in response to the variation in the one or more input parameters. In one example implementation that optionally may be combined with any of the features described herein, the degree of blur is varied from at least one iteration to at least one other based on a number of iterations that are to be used to reach the refined output. In one example implementation that optionally may be combined with any of the features described herein, the degree of blur for at least one of the iterations is selected based on a property of the image. In one example implementation that optionally may be combined with any of the features described herein, the one or more pixel merge operations include a contrast stretching operation. In one example implementation that optionally may be combined with any of the features described herein, the one or more pixel merge operations include a contrast stretching operation configured to consolidate pixels from the image having values satisfying one or both of (i) being above an upper threshold; and (ii) being below a lower threshold. In one example implementation that optionally may be combined with any of the features described herein, for at least one of the iterations, selecting one or more input parameters for the iteration includes selecting one or both of the upper cutoff and the lower cutoff. In one example implementation that optionally may be combined with any of the features described herein, the image of the eye is an RGB image, and wherein the multi-step filter is applied to only a red channel of the RGB image of the eye. In one example implementation that optionally may be combined with any of the features described herein, the instructions are further executable to perform a glint removal operation on the image of the eye. In one example implementation that optionally may be combined with any of the features described herein, the instructions are further executable to perform a glare removal operation on the image of the eye. In one example implementation that optionally may be combined with any of the features described herein, the image of the eye is an RGB image, and where performing the glare removal operation includes (i) generating a glare difference map that is an average difference of an image parameter value of pixels in different color channels of the RGB image; and (ii) subtracting the glare difference map from the image parameter value of pixels in each color channel of the RGB image. In one example implementation that optionally may be combined with any of the features described herein, the instructions are further executable to identify a limbus boundary in the image of the eye and constrain application of the multi-step filter to pixels within the limbus boundary.

In another example implementation, on a computing device, a method for identifying an eye feature, the method comprises obtaining, via a camera, an image of an eye, applying a multi-step filter to the image of the eye for a plurality of iterations, wherein applying the multi-step filter includes, for each iteration, (i) selecting one or more input parameters for use during the iteration, such selection being performed so that the one or more input parameters varies relative to at least one other iteration, (ii) performing one or more pixel merge operations on the image, where at least one of the pixel merge operations is controlled based on the one or more input parameters so as to control whether or not the iteration classifies pixels as corresponding to a feature of the eye, and (iii) outputting, based on operation of the one or more pixel merge operations, a provisional output in which some pixels of the image are deemed as corresponding to the feature of the eye, and outputting a refined output via combining the provisional outputs, where in the refined output, some pixels of the image are deemed as corresponding to the feature of the eye. In one example implementation that optionally may be combined with any of the features described herein, performing one or more pixel merge operations includes using an anisotropic diffusion filter configured to apply a degree of blur to the image of the eye, where the degree of blur varies for at least some of the iterations in response to the variation in the one or more input parameters. In one example implementation that optionally may be combined with any of the features described herein, the degree of blur is varied from at least one iteration to at least another iteration based on a number of iterations that are to be used to reach the refined output. In one example implementation that optionally may be combined with any of the features described herein, the degree of blur for at least one of the iterations is selected based on a property of the image. In one example implementation that optionally may be combined with any of the features described herein, performing one or more pixel merge operations includes performing a contrast stretching operation. In one example implementation that optionally may be combined with any of the features described herein, performing one or more pixel merge operations includes performing a contrast stretching operation.

In another example implementation, a computing system comprises a camera configured to image an eye, a logic machine, and a storage machine holding instructions executable by the logic machine to: obtain, via the camera, an image of the eye, apply a multi-step filter to the image of the eye for a plurality of iterations, wherein applying the multi-step filter includes, for each iteration, (i) applying an anisotropic diffusion filter to the image, the anisotropic diffusion filter configured to apply a degree of blur to the image, where the degree of blur used for at least one of the iterations varies from the degree of blur used for another of the iterations, (ii) performing a contrast stretching operation on the image, (iii) outputting, based on operation of the anisotropic diffusion filter and the contrast stretching operation, a provisional output in which some pixels of the image are deemed as corresponding to the feature of the eye, and output a refined output via combining the provisional outputs, where in the refined output, some pixels of the image are deemed as corresponding to the feature of the eye. In one example implementation that optionally may be combined with any of the features described herein, the degree of blur applied by the anisotropic diffusion filter is varied based on one or both of (1) a number of iterations that are to be used to reach the refined output; and (2) a property of the image.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system comprising: a camera configured to image an eye; a logic machine; and
    a storage machine holding instructions executable by the logic machine to: obtain, via the camera, an image of the eye;
    apply a multi-step filter to the image of the eye for a plurality of iterations, wherein applying the multi-step filter includes, for each iteration,
    (i) selecting one or more input parameters to one or more merge operations that adjust a pixel value of one or more pixels of the image of the eye, for use during the iteration, such selection being performed so that the one or more input parameters varies relative to at least one other iteration;
    (ii) performing the one or more pixel merge operations on the image of the eye, using the one or more input parameters selected for the iteration, where at least one of the pixel merge operations is controlled based on the one or more input parameters so as to control whether or not the iteration classifies pixels as corresponding to a feature of the eye; and
    (iii) outputting, based on operation of the one or more pixel merge operations, a provisional output in which some pixels of the image of the eye are deemed as corresponding to the feature of the eye; and
    output, via combining the provisional outputs, a refined output in which some pixels of the image of the eye are deemed as corresponding to the feature of the eye.

2. The computing system of claim 1 where the one or more pixel merge operations make use of an anisotropic diffusion filter configured to apply a degree of blur to the image of the eye, where the degree of blur varies for at least some of the iterations in response to the variation in the one or more input parameters.

3. The computing system of claim 2, where the degree of blur is varied from at least one iteration to at least one other iteration based on a number of iterations that are to be used to reach the refined output.

4. The computing system of claim 2, where the degree of blur for at least one of the iterations is selected based on a property of the image.

5. The computing system of claim 2, where the one or more pixel merge operations include a contrast stretching operation.

6. The computing system of claim 1, where the one or more pixel merge operations include a contrast stretching operation configured to consolidate pixels from the image having values satisfying one or both of (i) being above an upper threshold; and (ii) being below a lower threshold.

7. The computing system of claim 6, where for at least one of the iterations, selecting one or more input parameters for the iteration includes selecting one or both of the upper cutoff and the lower cutoff.

8. The computing system of claim 1 where the image of the eye is an RGB image, and wherein the multi-step filter is applied to only a red channel of the RGB image of the eye.

9. The computing system of claim 1, where the instructions are further executable to perform a glint removal operation on the image of the eye.

10. The computing system of claim 1 where the instructions are further executable to perform a glare removal operation on the image of the eye.

11. The computing system of claim 10, where the image of the eye is an RGB image, and where performing the glare removal operation includes (i) generating a glare difference map that is an average difference of an image parameter value of pixels in different color channels of the RGB image; and (ii) subtracting the glare difference map from the image parameter value of pixels in each color channel of the RGB image.

12. The computing system of claim 1, where the instructions are further executable to identify a limbus boundary in the image of the eye and constrain application of the multi-step filter to pixels within the limbus boundary.

13. On a computing device, a method for identifying an eye feature, the method comprising:
   obtaining, via a camera, an image of an eye;
   applying a multi-step filter to the image of the eye for a plurality of iterations, wherein applying the multi-step filter includes, for each iteration,
   (i) selecting one or more input parameters to one or more merge operations that adjust a pixel value of one or more pixels of the image of the eye, for use during the iteration, such selection being performed so that the one or more input parameters varies relative to at least one other iteration;
   (ii) performing the one or more pixel merge operations on the image of the eye, using the one or more input parameters selected for the iteration, where at least one of the pixel merge operations is controlled based on the one or more input parameters so as to control whether or not the iteration classifies pixels as corresponding to a feature of the eye; and
   (iii) outputting, based on operation of the one or more pixel merge operations, a provisional output in which some pixels of the image of the eye are deemed as corresponding to the feature of the eye; and
   outputting a refined output via combining the provisional outputs, where in the refined output, some pixels of the image of the eye are deemed as corresponding to the feature of the eye.

14. The method of claim 13, where performing one or more pixel merge operations includes using an anisotropic diffusion filter configured to apply a degree of blur to the image of the eye, where the degree of blur varies for at least some of the iterations in response to the variation in the one or more input parameters.

15. The method of claim 14, where the degree of blur is varied from at least one iteration to at least another iteration based on a number of iterations that are to be used to reach the refined output.

16. The method of claim 14, where the degree of blur for at least one of the iterations is selected based on a property of the image.

17. The method of claim 14, where performing one or more pixel merge operations includes performing a contrast stretching operation.

18. The method of claim 13, where performing one or more pixel merge operations includes performing a contrast stretching operation.

19. A computing system comprising:
   a camera configured to image an eye; a logic machine; and
   a storage machine holding instructions executable by the logic machine to:
   obtain, via the camera, an image of the eye;
   apply a multi-step filter to the image of the eye for a plurality of iterations, wherein applying the multi-step filter includes, for each iteration,
   (i) applying an anisotropic diffusion filter to the image of the eye, the anisotropic diffusion filter configured to apply a degree of blur to the image of the eye, where the degree of blur used for at least one of the iterations varies from the degree of blur used for at least one other iteration;
   (ii) performing a contrast stretching operation on the image of the eye;
   (iii) outputting, based on operation of the anisotropic diffusion filter and the contrast stretching operation, a provisional output in which some pixels of the image of the eye are deemed as corresponding to the feature of the eye; and
   output a refined output via combining the provisional outputs, where in the refined output, some pixels of the image of the eye are deemed as corresponding to the feature of the eye.

20. The computing system of claim 19, where the degree of blur applied by the anisotropic diffusion filter is varied based on one or both of (1) a number of iterations that are to be used to reach the refined output; and (2) a property of the image.

* * * * *